Figure 1:
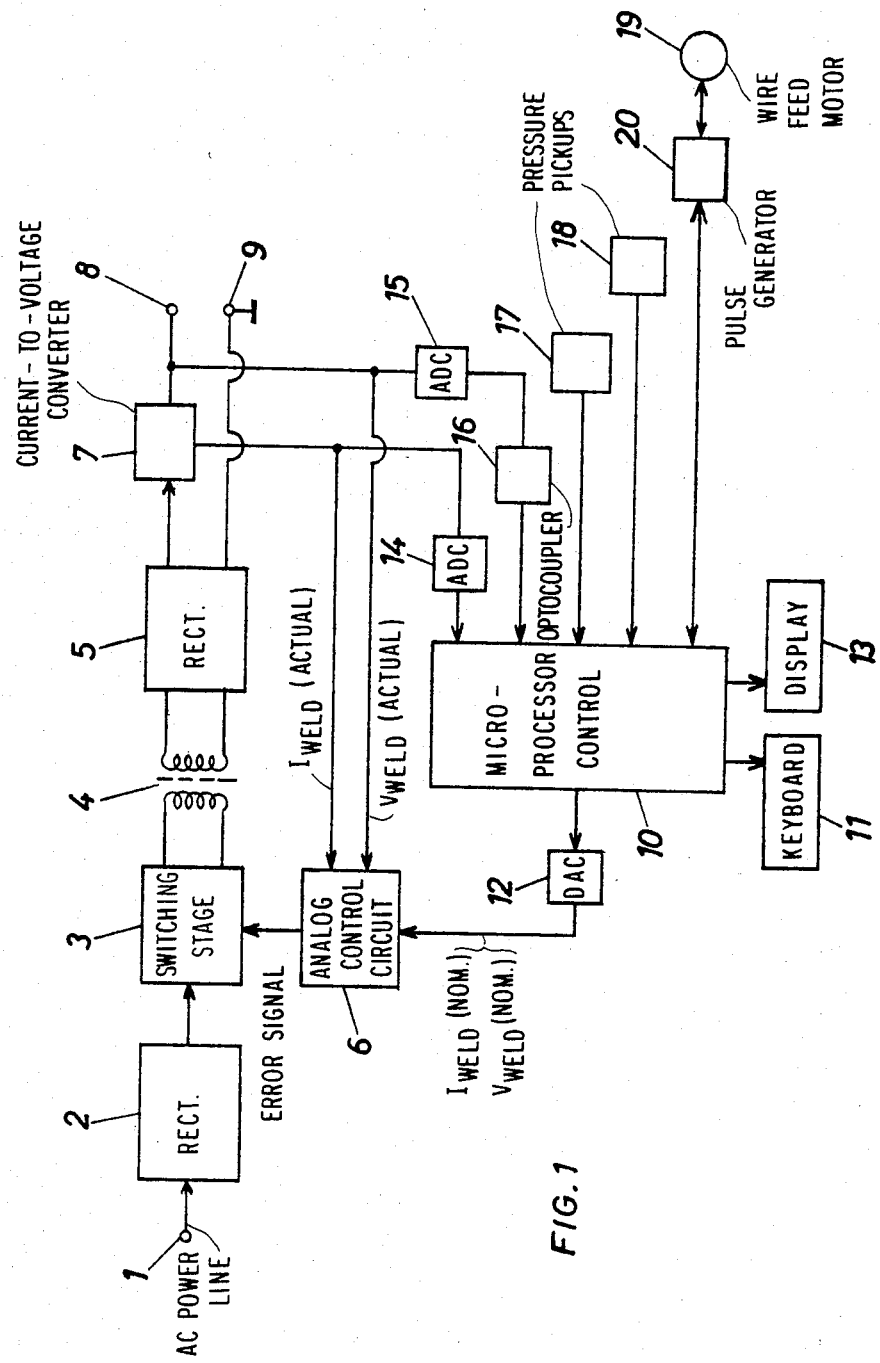

United States Patent [19]

Fronius

[11] Patent Number: 4,521,671
[45] Date of Patent: Jun. 4, 1985

[54] ELECTRONIC WELDING APPARATUS
[75] Inventor: Klaus Fronius, Pettenbach, Austria
[73] Assignee: Miller Electric Manufacturing Company, Appleton, Wis.
[21] Appl. No.: 542,617
[22] Filed: Oct. 17, 1983
[30] Foreign Application Priority Data
Oct. 21, 1982 [AT] Austria ................................. 3867/82
[51] Int. Cl.³ .............................................. B23K 9/10
[52] U.S. Cl. .......................... 219/130.31; 219/130.32; 219/130.33; 363/95
[58] Field of Search ...................... 219/130.31, 130.32, 219/130.33, 130.51, 125.11, 130.21; 363/98, 132, 95

[56] References Cited
U.S. PATENT DOCUMENTS 4,020,361 4/1977 Suelzle et al. ......................... 363/132
4,201,906 5/1980 Puschner ......................... 219/130.33
4,403,269 9/1983 Carroll ................................. 363/132

OTHER PUBLICATIONS

A. J. Weissberger, "Microprocessors Simplify Industrial Control", *Electronic Design 22,* 10/25/1975, pp. 96–99.

Primary Examiner—Clifford C. Shaw
Attorney, Agent, or Firm—Sughrue, Mion, Zinn, Macpeak, and Seas

[57] ABSTRACT

An electric welding apparatus which, for controlling at least one welding parameter, such as welding voltage or welding current, comprises a switching mode power supply (SMPS) as control element, the switching mode power supply preferably being regulated on the primary. The actual values of voltage and current are taken from the output of the switching mode power supply and fed to an analog control circuit. The set values of voltage and current are fed to a microprocessor via an entry keyboard, and in the microprocessor they are stored in a memory and passed on in analogous form to the analog control circuit which carries out a comparison of set value and actual value and, in dependence thereon, produces an error signal that is fed to a pulse width modulator of the switching mode power supply. The pulse width modulator is connected to the driver stages of the switching stages of the switching mode power supply, which switching stages are designed as boost regulator of buck regulator, and thus a pulse width modulation of the current pulses of the switching stages is effected in dependence on the difference between actual and nominal value. The converter section of the switching mode power supply preferably is designed as a modified single-ended buck regulator or as a push-pull full bridge, wherein it is operated at a fixed clock frequency of about 25 kHz. The secondary coil of the transformer of the switching mode power supply being either direct in connection with the output connection terminals of the switching mode power supply, or a secondary rectifier is connected between the secondary coil and the output connection terminals, whereby the secondary rectifier can be bridged by switch means.

2 Claims, 3 Drawing Figures

1

ELECTRONIC WELDING APPARATUS

BACKGROUND OF INVENTION

There are already known electric welding apparatus that comprise controlled rectifiers (thyristors). This and similar types of welding apparatus, however, will not do without voluminous and heavy-weight power transformers.

On the other hand, electronically controlled power supplies for small and medium power outputs, which are designed as socalled switched-mode power supplies (SMPS), are known primarily from laboratory technology and entertainment electronics. There, the power voltage at first is rectified, then "chopped" by a high switching frequency (mostly above 20 kHz), transformed to the desired voltage via a transformer, and finally rectified anew. By chosing a high switching frequency, the efficiency can be increased on the one hand and the volume and weight of the transformer can be considerably reduced on the other hand. There is a difference between primarily controlled and secondarily controlled switched mode power supplies, the control being effected either by changing the clock time at a constant frequency or by changing the frequency at a constant operation pulse duration. Mostly, quick power transistors with high operational voltages are used.

The field of application of switched mode power supplies so far has been restricted to television sets, LF power amplifiers, measuring devices, film and still projectors, accounting, calculating and typing machines, computers, voltage and current stabilizers for industry and laboratories, power supplies for fluorescent lamps, HF and LF generators, motor control, accumulator chargers, AC/AC-converters and low voltage power supplies with galvanic power separation. Depending on the output (1 to 3,000 W and more), the following types of converters are chosen with an increased output: single-ended boost regulators, single-ended buck regulators, push-pull half bridge, push-pull full bridge and push-pull parallel feed.

In particular with switched mode power supplies of higher outputs the problem arises that, due to power overvoltages or to line-side short-circuits, the admissible limits $U_{max}$, $J_{max}$ of the transistors used can be exceeded, which leads to a destruction of the transistors. Therefore, complex safety cut-out and operation-sequence circuits are required, e.g. overvoltage, peak current, overload, short-circuit fuse protections, switch-on and restarting measures and the like, which are mostly unnecessary with switched-mode power supplies of smaller outputs, since there the transistors may be chosen to be overdimensioned from the beginning in order to offer a certain safety. Therefore there has been a prejudice to building switched-mode power supplies of higher outputs, which are necessary e.g. for electric welding apparatus (more than 10,000 W).

OBJECT OF INVENTION

It is the object of the invention to remedy this prejudice and to provide a novel electronic welding apparatus by using a switched-mode power supply, so that the weight and volume of the welding tool can be reduced and its efficiency can be increased.

SUMMARY OF INVENTION

The invention provides a novel electronic welding apparatus in which as control element for controlling at least one welding parameter, such as the welding current or the welding voltage, a controlled switched-mode power supply is provided. Preferably, a primary controlled switched-mode power supply is used, whose converter preferably is designed as a single-ended buck regulator with an asymmetric half-bridge switch, or as a push-pull full bridge, wherein it is operated at a fixed clock frequency of about 25 kHz, a change of the pulse duty cycle taking place by pulse-width modulation.

Figure 2:
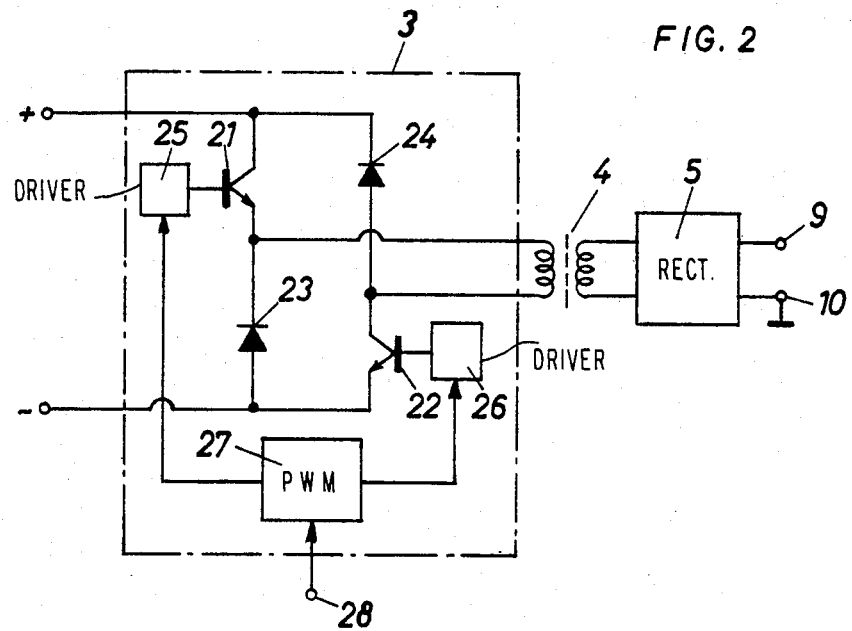
Figure 3:
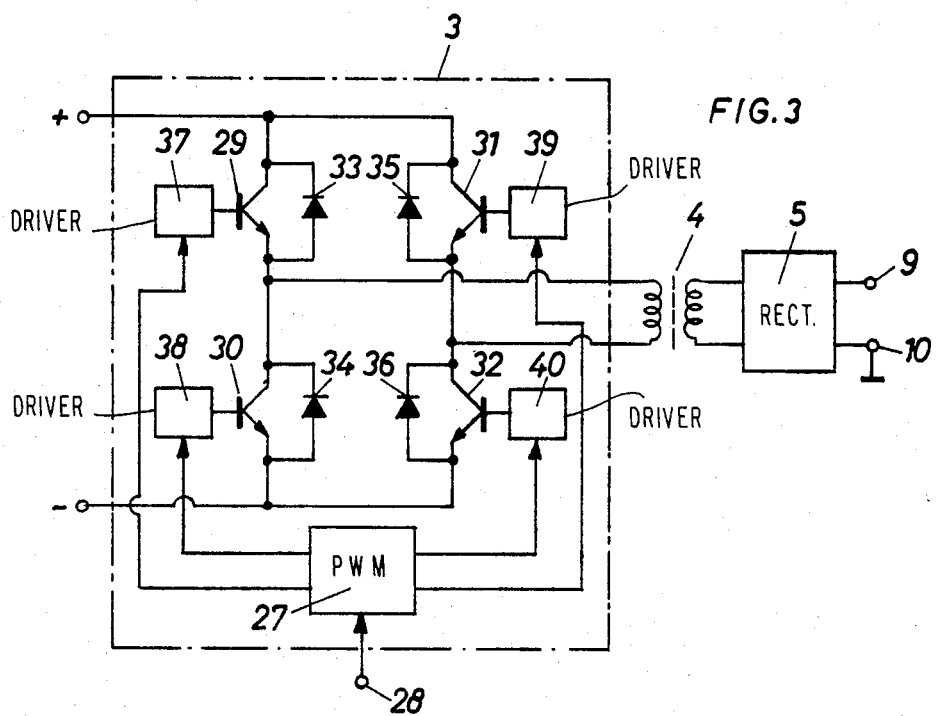

Further characteristic features and details of the invention will be described in the following with reference to the accompanying drawings, wherein:

FIG. 1 is a block diagram of a welding apparatus including a switched-mode power supply, FIG. 2 illustrates the converter section of the switched-mode power supply as a single-ended buck regulator with an asymmetric half-bridge switch according the invention and, FIG. 3 illustrates the converter section as a push-pull full bridge according to the invention.

Same parts shown in the drawings are provided with the same reference numerals.

In FIG. 1 the power supply (e.g. 3×380 V rotary current or 220 V light current) is denoted by 1 and a power line rectifier is denoted by 2, which may also contain a power filter (not illustrated). To the rectifier 2 the converter or the switching stage 3 of the switched-mode power supply are connected, the rectified voltage being smoothable by filtering means, for instance, by capacitors (not illustrated).

The switching stage 3 contains switching transistors (bipolar power transistors, field-effect power transistors) or thyristors that can be switched on and off, which are controlled by a pulse-width modulator via driver stages, as will be explained later on by way of FIGS. 2 and 3. The switching transistors of the switching stage 3 chop the direct voltage supplied from the rectifier 2 and the chopped direct current is delivered through the primary coil of a transformer 4. To the secondary coil of the transformer 4 a secondary rectifier 5 is connected, which generates the desired welding current or welding voltage, a filter choke (not illustrated) being provided, if required.

The pulse width modulator in the switching stage 3 is controlled by an analog control circuit 6 by way of an error signal, to which analog control the nominal and actual values of the welding current and the welding voltage are fed. For this purpose, a current/voltage converter (e.g. a Hall converter) 7 is provided at the output of the rectifier 5 to detect the actual value of the welding current while the actual value of the welding voltage is taken directly. A terminal 8 departing from the current/voltage converter 7 as well as a terminal 9 departing from the secondary rectifier 5 serve to connect the welding cable, the terminal 9 being connected to frame. In this embodiment a microprocessor control 10 is provided, which fulfills a plurality of controlling and regulating functions. Via an entry keyboard 11 the nominal values of the welding current or of the welding voltage may be entered into a storage of the microprocessor control 10, which are then read out and fed to the analog control circuit 6 via a digital to analog converter 12. A preferably alphanumerical display 13 indicates the nominal values entered. On grounds of the difference between the actual and nominal values, the analog control circuit 6 emits an error signal to the pulse width modulator and controls the switching stage 3 in a manner that a substantially constant welding current, or optionally a constant welding voltage occur at the output of the switched-mode power supply. The structure of the analog control circuit 6 is known to one skilled in the art and thus need not be discussed in detail.

Furthermore, it is provided according to the invention that the values of the welding current and the welding voltage of the microprocessor control are fed via analog to digital converters 14 and 15 in order to calculate an output value on grounds of the product formation of current and voltage, which is fed to the analog control circuit 6 as the actual value. This kind of actual value as a function of the output is advantageous for some welding procedures. For the purpose of galvanic separation, an optocoupler 16 is provided between the microprocessor control 10 and the analog-to-digital converter 15.

To the microprocessor control 10 also the signals of two pressure pickups 17 and 18 are transmitted, which are arranged in the line for the protection gas and in the water cooling cycle, the pressure thus being monitored and the welding procedure being initiated. The pressure values also may be indicated via the display 13.

The monitoring and control of a wire feed motor 19 also is effected via the microprocessor control 10, the number of revolutions being detected, for instance, by an optoelectronic rotatable pulse generator 20 and transmitted as the actual value to the microprocessor control.

The input of the desired values for the rate of wire feed, wire thickness, type of gas, etc. is effected also via the entry keyboard 11, wherein e.g. the connection between the welding voltage on the one hand and the rate of wire feed, the wire thickness and the type of gas on the other hand are stored as a program in a storage (e.g. a wire-read storage) of the microprocessor control 10. Thereby it is possible to store any desired welding adjustments and to call them on demand (e.g. for robot welding).

In this example of the invention, an analog control circuit 6 is provided for controlling the switching section 3, but it is also possible to extend the microprocessor control 10 so as to replace the analog control circuit 6 by taking over its function.

The welding tool according to the invention is excellently suited for the MIG-MAG, pulsed-arc, WIG and manual electrode welding procedures.

The alphanumerical display 13, if desired, may be replaced by a data display, a printer or an audio response unit.

By using several parallelly connected voltage-stable power switching transistors as switches in the switching stage 3, welding apparatus of the type according to the invention having a nominal output of from 13 kVA to 50 kVA can be manufactured.

FIG. 2 illustrates a switching stage 3 that is known as a single-ended buck regulator with an asymmetrical half-bridge converter. Two switching transistors 21,22 are parallelly connected via diodes 23,24 arranged in series, and are fed by the direct voltage supplied from the power line rectifier 2 (FIG. 1). The primary coil of the transformer 4 is connected with the diodes 23,24 between the respective connection points of the transistors 21,22. The transistors 21,22 are simultaneously switched on and off by the pulse width modulator 27 via driver stages 25,26, the input terminal 28 of the modulator being connected with the output of the analog control circuit 6 (FIG. 1). The pulse width modulator 27 may, for instance, contain a saw-tooth or delta voltage generator, which determines the pulse width of the currents in the transistors 21,22 in terms of the error signal emitted from the analog control via a comparator. If the transistor 21,22 are switched off, the induction current supplied from the primary coil of the transformer 4 flows off via the diodes 23,24.

FIG. 3 shows a switching stage 3 that is known as a push-pull fullbridge converter. Two switching transistors 29,30 and 31,32 arranged in series are each connected in parallel and fed by the direct voltage supplied from the power line rectifier 2 (FIG. 1). To each collector-emitter path of the transistors 29,30 and 31,32, diodes 33,34 and 35,36 are connected in parallel, which, as in the preceding example, divert the induction current of the primary coil of the transformer 4 in the switched-off state of the transistors. The primary coil of the transformer 4 is connected between the respective points of connection of the switching transistors 29,30 and 31,32 arranged in series. The transistors 29,32 on the one hand and the transistors 30,31 are alternately switched on and off by the pulse width modulator 27 via driver stages 37,38 and 39,40, the input terminal 28 of the modulator again being connected with the output of the analog control circuit 6 (FIG. 1).

With the example of a switching stage 3 according to FIG. 2 or 3 it is also possible, according to the invention, to work without secondary rectifier 5, i.e. that the secondary coil is directly connected with the output terminals 9 and 10. Consequently, an alternating current is available for welding, that is particularly suited for argon-arc or WIG(TIG) welding of aluminum or non-ferrous metals. The direct connection may be realized, for instance, by bridging the secondary rectifier 5 by means of switches. As has already been mentioned in connection with the embodiment of FIG. 1, the desired output of the switched-mode power supply can be achieved by a parallel connection of several switching transistors.

What I claim is:

1. In an electronic welding apparatus including a control element for controlling at least one welding parameter, such as welding current or welding voltage, the improvement which is characterised in that said control element is a controlled switching mode power supply, wherein an analog control circuit having an output is provided for controlling said switching mode power supply on its primary, the actual values of the welding current and the welding voltage being fed to said analog control circuit, and wherein said switching mode power supply has an output, and further comprising a current/voltage converter provided at the output of the switching mode power supply for the actual value of the welding current, the actual value of the welding voltage being taken directly at the output of the switching mode power supply, a microprocessor control, the nominal value of said at least one welding parameter being fed to the analog control circuit of said switching mode power supply via said microprocessor control, an entry keyboard and a display both connected to said microprocessor control, a switching stage provided for said switching mode power supply and containing semiconductors as switching means, a pulse width modulator connected to the output of said analog control circuit, and driver stages, said switching means being controlled by said pulse width modulator via said driver stages; wherein said switching stage is designed as an unsymmetrical half-bridge converter constituted by two switching transistors, further comprising diodes arranged in series and a power line rectifier providing a direct current, said two switching transistors being connected in parallel via said diodes and being fed by said direct current provided by said power line rectifier, a transformer provided for said switching mode power supply and having a primary coil and a secondary coil, and connection points of the two switching transistors with said diodes, said primary coil of said transformer being connected between the respective connection points of the two switching transistors with said diodes, said two switching transistors being simultaneously switched on and off by said pulse width modulator of said switching mode power supply via said driver stages, and said pulse width modulator having an input connection connected with the output of said analog control circuit, connection terminals being provided at the output of said switching mode power supply, a secondary rectifier between said secondary coil and said connection terminals, and switch means, bridging said secondary rectifier, for selectively effecting a direct connection between said secondary coil and said connection terminals.

2. In an electronic welding apparatus including a control element for controlling at least one welding parameter, such as welding current or welding voltage, the improvement which is characterised in that said control element is a controlled switching mode power supply, wherein an analog control circuit having an output is provided for controlling said switching mode power supply on its primary, the actual values of the welding current and the welding voltage being fed to said analog control circuit, and wherein said switching mode power supply has an output, and further comprising a current/voltage converter provided at the output of the switching mode power supply for the actual value of the welding current, the actual value of the welding voltage being taken directly at the output of the switching mode power supply, a microprocessor control, the nominal value of said at least one welding parameter being fed to the analog control circuit of said switching mode power supply via said microprocessor control, an entry keyboard and a display both connected to said microprocessor control, a switching stage provided for said switching mode power supply and containing semiconductors as switching means, a pulse width modulator connected to the output of said analog control circuit, and driver stages, said switching means being controlled by said pulse width modulator via said driver stages; wherein said switching stage is designed as a full-bridge converter constituted by switching transistors, each two of which are arranged in series to form a first pair and a second pair, further comprising a power line rectifier providing a direct current, said switching transistors being fed by said direct current, a transformer provided for said switching mode power supply and having a primary coil and a secondary coil, connection points of said switching transistors arranged in series, said primary coil of said transformer being connected between the respective connection points of the switching transistors, and further comprising diodes connected in parallel to each emitter-collector path of said switching transistors, one transistor of the first pair of switching transistors and one transistor of the second pair of switching transistors together being alternately switched on and off by said pulse width modulator of said switching mode power supply via said driver stages, said pulse width modulator having an input connection connected with the output of said analog control circuit, connection terminals at the output of said switching mode power supply, a secondary rectifier between said secondary coil and said connection terminals, and switch means, bridging said secondary rectifier, for selectively effecting a direct connection between said secondary coil and said connection terminals.

* * * * *